United States Patent [19]
Shimazu et al.

[11] Patent Number: 5,648,105
[45] Date of Patent: Jul. 15, 1997

[54] APPARATUS FOR MAKING A PLURALITY OF OPTICAL RECORD DISC SUBTRATES

[75] Inventors: Seiki Shimazu; Kenji Yamaga; Yoshimi Sakai; Atsushi Koyama; Yuichi Namikawa, all of Tokyo, Japan

[73] Assignee: TDK Corporation, Tokyo, Japan

[21] Appl. No.: 499,443

[22] Filed: Jul. 6, 1995

Related U.S. Application Data

[62] Division of Ser. No. 145,236, Nov. 3, 1993, Pat. No. 5,458,821.

[30] Foreign Application Priority Data

| | | | |
|---|---|---|---|
| Nov. 4, 1992 | [JP] | Japan | 4-317916 |
| Feb. 26, 1993 | [JP] | Japan | 5-061274 |
| Sep. 27, 1993 | [JP] | Japan | 5-260419 |

[51] Int. Cl.$^6$ .................................. B29C 45/80
[52] U.S. Cl. ............... 425/139; 264/40.5; 264/106; 264/154; 264/161; 425/145; 425/147; 425/556; 425/810
[58] Field of Search .................. 425/139, 150, 425/165, 145, 146, 147, 810, 536; 264/2.2, 40.1, 40.5, 106, 107, 154, 155, 161, 297.2, 328.7, 328.8

[56] References Cited

U.S. PATENT DOCUMENTS

| | | | |
|---|---|---|---|
| 3,989,436 | 11/1976 | McNeely et al. | 425/810 |
| 4,091,057 | 5/1978 | Weber | 264/328 |
| 4,828,769 | 5/1989 | Maus et al. | 264/2.2 |
| 4,971,548 | 11/1990 | Asai | 425/810 |
| 5,015,426 | 5/1991 | Maus et al. | 425/297.2 |
| 5,059,364 | 10/1991 | Okubo et al. | 425/150 |
| 5,244,606 | 9/1993 | Maus et al. | 425/556 |

*Primary Examiner*—Tim Heitbrink
*Attorney, Agent, or Firm*—Oblon, Spivak, McClelland, Maier & Neustadt, P.C.

[57] ABSTRACT

A method of making a plurality of optical record disc substrates includes the steps of injecting a resin material into a plurality of disc-shaped cavities which are formed by closing a fixed mold half and a movable mold half; and cooling the injected resin material in the cavities. The cavities are grouped into a plurality of groups so that each group includes not less than one cavity, and each group is provided with a common actuation device so that each actuation device is independently operated.

7 Claims, 6 Drawing Sheets

APPARATUS FOR MAKING A PLURALITY OF OPTICAL RECORD DISC SUBTRATES

This is a Division of application Ser. No. 08/145,236 filed on Nov. 3, 1993, now U.S. Pat. No. 5,458,821.

BACKGROUND OF THE INVENTION

1. Field of the Invention

The present invention relates to a method of making a plurality of optical record disc substrates, and an apparatus therefore, wherein optical record disc substrates such as optical record discs and magnet-optic discs are formed, in particular a method of making a plurality of optical record disc substrates and an apparatus therefore, wherein at least two disc-shaped cavities are arranged in a mold, and optical record disc substrates can be made in multiple-molding.

2. Discussion of the Background

It has been known that a conventional optical record disc injection-molding process injects a molten resin into a mold with a cavity, compresses the injected resin by using an external force to lessen the volume of the cavity, and gives a predetermined shape to the compressed resin. The conventional means for lessening the volume of the cavity includes the use of a mold closing force of a molding device or the use of a hydraulic cylinder provided in a mold.

In such a type of optical disc molding, a single-molding mold has mostly been utilized because equal application of a mold closing force, and the presence of a radial flow where the flow of a resin in the cavity spreads out from the center to radial directions of a disc substrate are required in accordance with characteristics needed for the disc substrate.

However, such a single-molding mold involves inefficient productivity, and a plurality of molding devices are installed to increase a production capacity for increased production. This arrangement has a disadvantage in that improvement in cost is difficult. A multiple-molding process and an apparatus therefore which have efficiency productivity are coming into practice.

The multiple-molding according to a conventional inject-molding process involves a problem in that variations in charge among plural cavities have a direct effect to the molded product to create variations among them. This is because the volume of resin charge, the actuation timing of core bodies and cut punches, and the distribution of a mold closing force with respect to the plural cavities are controlled together as the entire mold without being independently controlled at the respective cavities. In other words, such variations in charge have a direct effect to the molded product to create variations in thickness and internal strain of the molded discs, thereby creating problems in that the discs warp and optical characteristics are poor. When a single mold is used to carry out a multiple-molding process wherein two record discs or more are molded simultaneously, a single stream of molten resin which has been injected from a molding device cannot be equally distributed to the two cavities or more. All gates at a molten resin inlet through which the distributed molten resin is injected into the cavities are difficult to be formed in the same sizes in terms of the structure of the mold. For these reasons, all cavities cannot have the molten resin injected therein under the same conditions, creating a problem in that all disc substrates cannot meet required characteristics.

SUMMARY OF THE INVENTION

It is an object of the present invention to eliminate those disadvantages, and to provide in an inexpensive manner a method of making a plurality of optical record disc substrates and an apparatus therefore, wherein optical record discs which can meet characteristics required for optical discs and have good quality can be molded in a multiple-molding process, and productivity can be remarkably improved.

The present invention provides a method of making a plurality of optical record disc substrates, comprising: injecting a resin material into a plurality of disc-shaped cavities which are formed by closing a fixed mold half and a movable mold half; and cooling the injected resin material in the cavities; wherein the cavities are grouped into a plurality of groups so that each group includes not less than one cavity, and each group is provided with a common actuation means so that each actuation means is independently operated.

It is preferable that the movable mold half includes a plurality of core bodies and a plurality of cut punches to be slidable, the core bodies and the cut punches are provided with hydraulic actuation mechanisms, respectively, and either one of a group and a plurality of groups of the hydraulic actuation mechanisms are independently operated.

The present invention also provides for an apparatus for making a plurality of optical record disc substrates, comprising: a fixed mold half; a movable mold half; a plurality of core bodies which are provided in the movable mold half to be slidable and to form a plurality of cavities; and a plurality of actuation mechanisms, each including a hydraulic cylinder for sliding its cooperating core body, and a hydraulic control circuit having a hydraulic pressure control valve for controlling its corresponding hydraulic cylinder; wherein the actuation of the respective core bodies is independently made in a multistage control with a hydraulic pressure and timing combined.

It is preferable that each actuation mechanism comprises a core compression hydraulic cylinder connected to the core body through a core block to slide the core body, and a cut punch cylinder and an ejection cylinder connected to a gate cut, an ejection pin and an ejection sleeve through a block to slide the gate cut, the ejection pin and the ejection pin.

It is preferable that each core body is arranged to confront its associated fixed cavity, and is fit in an outer peripheral ring to be slidable therein, and has a central portion provided with a movable gate cutter, an ejection sleeve and an ejection pin to be slidable is an axial direction.

It is preferable that a plurality of region flow passage for the cavities are arranged to be located at equal distances about an injection molding mold spool for charging a molten region, and are placed between a movable platen and a fixed platen.

The present invention further provides an apparatus for making a plurality of optical record disc substrates, comprising: a fixed mold half; a movable mold half; a driving means for opening and closing the movable mold half with respect to the fixed mold half; a plurality of cavities which are formed between the movable mold half and the fixed mold half; an injection means for injecting a resin material into the cavities; and a plurality of cut punches which come in and out of the respective cavities to punch a hole in the center of discs formed in the core bodies; wherein the cavities are grouped into a plurality of groups so that each group includes not less than one cavity, and each group is provided with a common actuation means so that the actuation of the respective actuation means is independently made in either one of a combination of a hydraulic pressure and timing, and timing control.

It is preferable that each cut punch has a movable ejection pin passed through its central portion, and the ejection pin is actuated by a common pin actuation means.

In accordance with an optical disc multiple-molding process of the present invention, even if there are variations in charge of a molten resin among the plural cavities, the actuation of the core bodies or the cut punches can be independently done at appropriate timing in the respective cavities to make the amount of charge in the cavities a uniform level. In particular, when the molten resin is injected from a nozzle after the mold is closed, the injected resin diverges in the mold with a high temperature kept, and passes through a heating medium with a high temperature kept. Then, it is equally charged in such a manner that it spreads out from the center to radial directions of the respective cavities. Actuation mechanisms of the hydraulic cylinders for core compression or the cut punches are operated from the time when charging the molten resin starts. The actuation mechanisms can be controlled with a hydraulic pressure, timing, or a combination of a hydraulic pressure and timing in the charge step, a pressure-maintaining step and a cooling step of the molten resin to compensate shrinkage of the resin due to cooling, thereby obtaining a sufficient transfer from the surface of a stamper, minimizing the occurrence of optical deformation, eventually satisfying characteristics required for optical record disc substrates, and forming a central aperture in the receptive optical disc substrates in the mold.

In addition, after cooling the molten resin in the mold has been completed and the mold has been opened, actuation mechanisms for ejection are operated to eject the optical record disc substrates by ejection sleeves through ejection blocks, and to remove runners by removers which are protruded from the mold by ejection pins.

The present invention can solve the problems, improve the quality of optical record discs significantly, provide reliable discs in quantity production, and contribute a decrease in cost. Further, the compression operation of the respective core bodies, or a combination of a hydraulic pressure and timing for the cut punch actuation cylinders can be independently controlled at optimum conditions to cope with imbalance in charge of the molten resin which occurs among the plural cavities in the single mold. In this manner, optical record disc molding can be effectively done in a multiple-molding manner wherein two record discs or more can be simultaneously molded, characteristics required for optical record disc substrates can be satisfied, multiple-molding of optical discs having high quality can be done with high-precision, and productivity can be remarkably increased.

DESCRIPTION OF THE PREFERRED EMBODIMENTS

Figure 1:
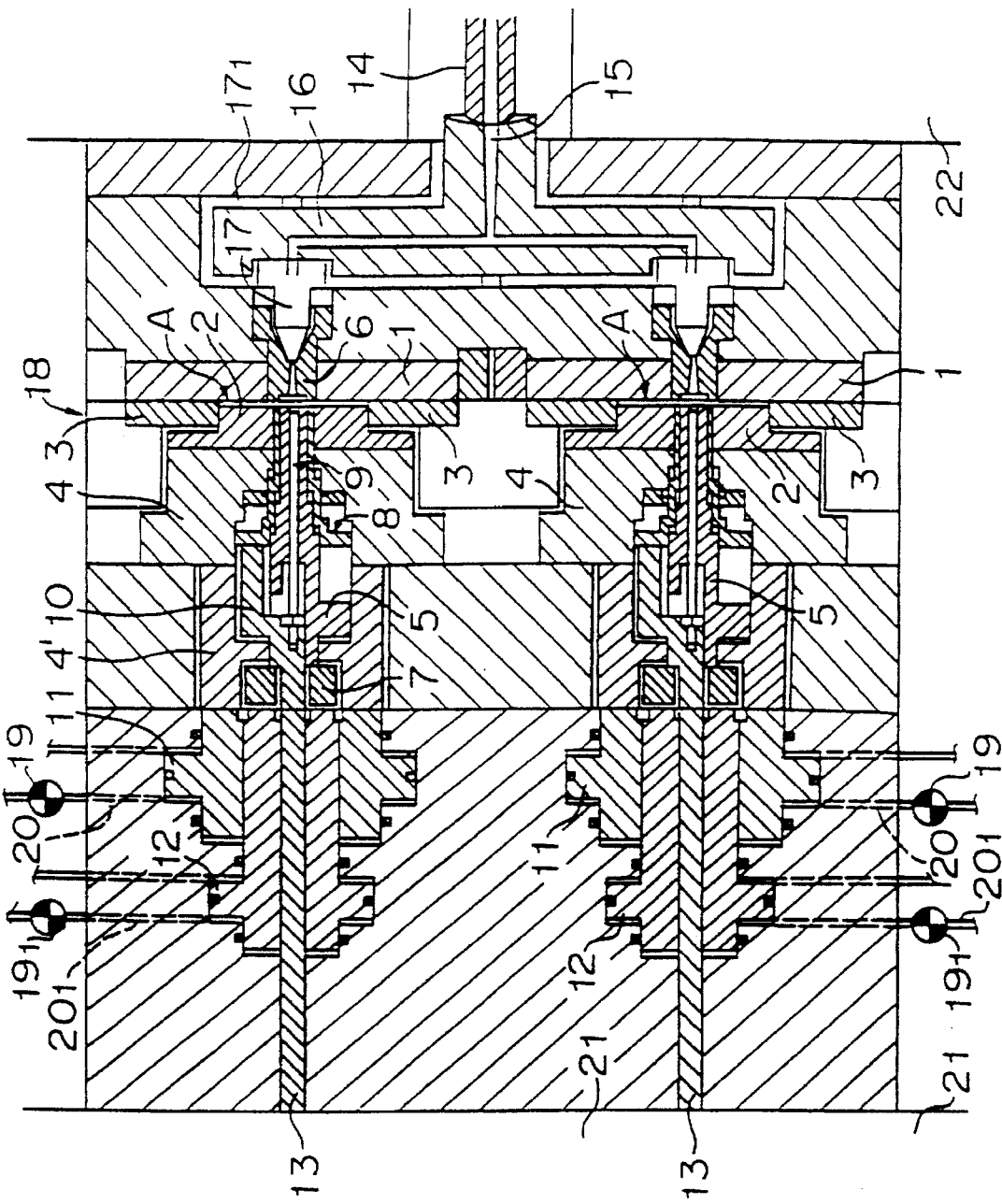
FIG. 1 is a longitudinal cross sectional view showing a first embodiment of the present invention.

Now, the present invention will be described in detail with reference to preferred embodiments illustrated in the accompanying drawings.

An embodiment of the present invention shown in FIGS. 1-3, i.e. a case wherein two movable core compressing cylinders are incorporated between a two optical disc molding mold and a movable platen of a molding device will be explained. Cavity bodies 1 as a fixed mold half, and core bodies 2 and outer peripheral rings 3 as a movable mold half to confront the fixed mold half form two disc-shaped cavities A in an injection molding mold 18. The core bodies 2 and 2 are provided with hydraulic actuation mechanisms having compression cylinders 11. The respective compression cylinders 11 are arranged to communicate with hydraulic control circuits 20 including hydraulic control valves 19 which can control the cylinders in an independent and multi-stage manner. The actuation of the core bodies 2 and 2 can be independently done in a multi stage control with a combination of a hydraulic pressure and timing. An optical disc molding apparatus according to the present invention is provided to have such an arrangement, and can mold reliable optical discs having good quality.

The hydraulic actuation mechanisms including the compression cylinder 11 are operationally connected to the movable core body 2 through one or a plurality of core blocks 4, 4' in order to slide the core body 2. Cut punch cylinders 12 and ejection cylinders are connected to cut punches 5, ejection pins 9 and ejection sleeves 8 through blocks 10 in order to slide the cut punches, the ejection pins and the ejection sleeves. The two core bodies 2 and 2 are arranged to confront and face the cavity bodies 1 on the fixed mold half, respectively, and are fitted in the outer peripheral rings 3 and 3 to be slidable in an axial direction by the compression cylinders 11. The respective core bodies have their central portions provided with the cut punches 5, the ejection sleeves 8 and the ejection pins 9 to be slidable in the axial direction.

The compression cylinders 11 are incorporated in the respective movable core bodies 2, and have such a structure that the respective movable core bodies are operated in a multi-stage control with a combination of the optimum hydraulic pressure and the optimum timing to cope with imbalance in charge of a molten resin so that both optical record disc substrates can meet required characteristics.

The disc-shaped cavities A which are constituted by the core bodies 2 and other members are arranged in a plural manner at equal distance on both sides of the center of a sprue bushing 15 for charging the molten resin in a mold body, or in a radial or H-shaped pattern in the case of the presence of three cavities or more. The cavities are arranged between a movable platen 21 and a fixed platen 22 of the molding apparatus.

The cut punches 5 are used to form a central aperture in the disc substrates during molding, and are engaged with the ejection sleeves 8 to be protruded and withdrawn by the cut punch cylinders 12 through cut punch blocks 7. When the cut punches 5 are protruded, their leading edges get in touch with fixed gate cuts 6 to form center apertures in the substrates. When the cut punches 5 are withdrawn, their leading edges and the fixed gate cuts 6 form spaces to provide molten resin inlets (gates).

Figure 2:
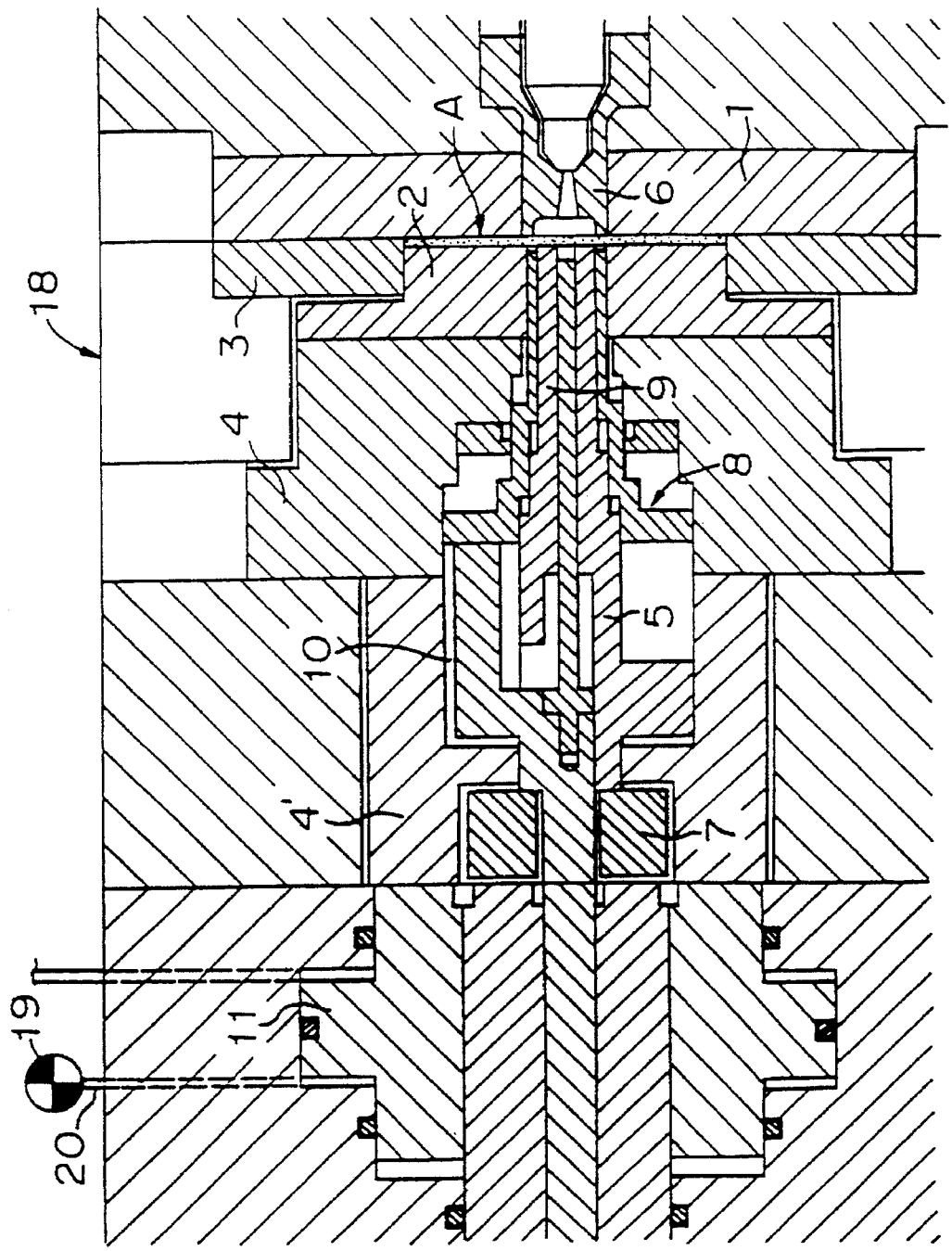
FIG. 2 is an enlarged longitudinal cross sectional view showing a portion of FIG. 1.
Figure 3:
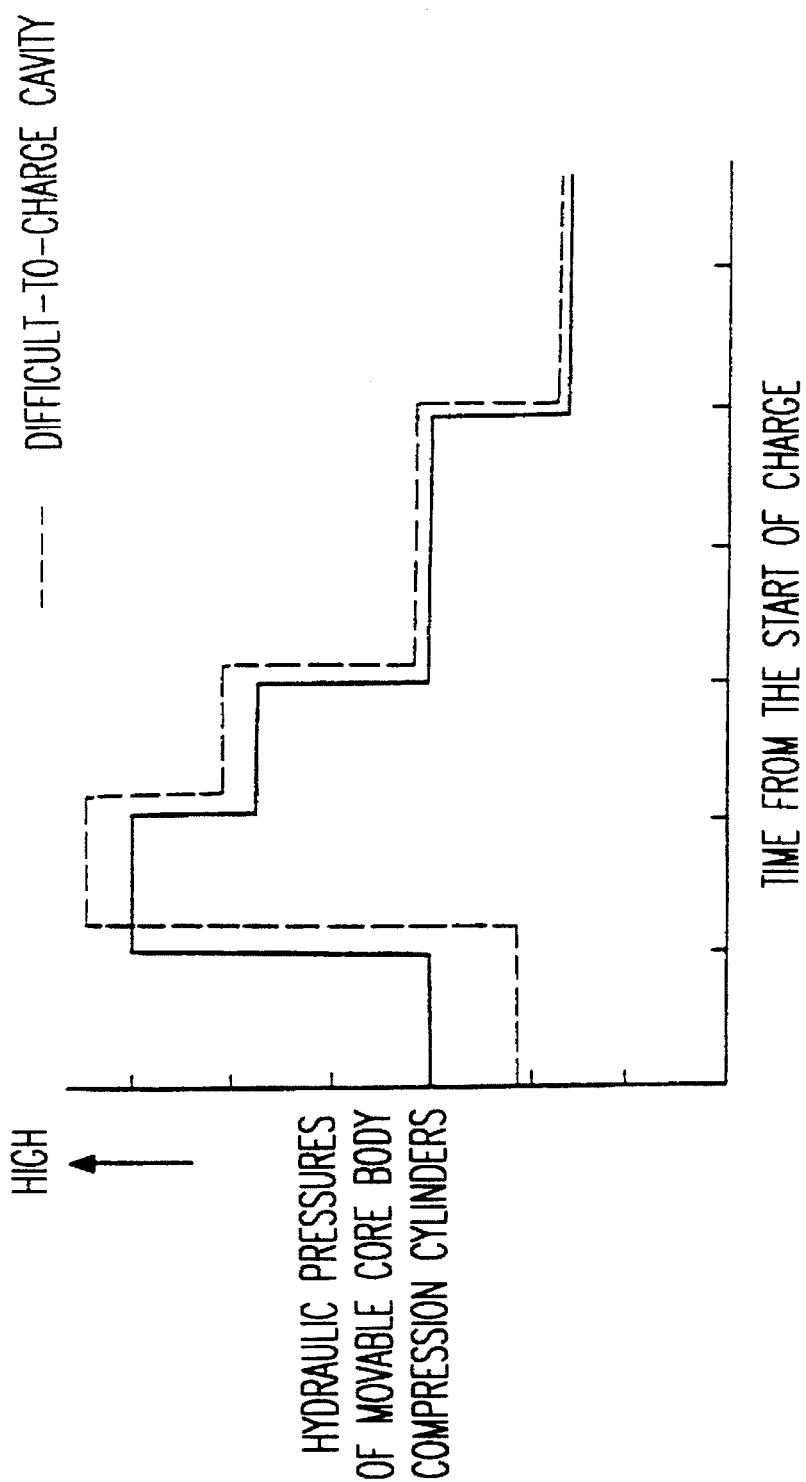
FIG. 3 is a graph showing characteristic curves with respect to the relation between hydraulic pressures and charge progress in a charge step in the apparatus of FIG. 1.

In FIGS. 1 and 2, reference numeral 8 designates the ejection sleeve which is formed to be in a sleeve shape for ejecting an optical recording disc substrate. Reference numeral 9 designates the ejection pin for removing a runner. The ejection sleeve and the ejection pin can be protruded and withdrawn by the ejection hydraulic cylinder through the ejection block 10. Reference numeral 13 designates an ejection rod. Reference numeral $17_1$ designates a heating medium passage. The injection molding mold 18 is provided with a cooling means as usual.

In a resin charging step, the molten resin is injected into the sprue bushing 15 from a nozzle 14 of an injection molding device. The injected molten resin diverges in a divergent block 16 in the mold with a predetermined temperature kept. The molten resin passes through a heating medium 17 with a predetermined temperature maintained. From the spaces (gates) defined by the fixed gate cuts 6 and the withdrawn cut punches 5, the injected resin is equally charged in the disc shaped cavities A and A constituted by the cavity bodies 1, the core bodies 2 and the outer peripheral rings 3 so that the resin spreads out from the center of the cavities to radial directions in a radial flow pattern.

In the first embodiment, when the molten resin starts to be charged, the compression cylinders 11 are actuated to move the movable core bodies 2 toward the fixed cavity bodies 1 through the core blocks 4 and 4'. In the charge step, a pressure-maintaining step and a cooling step of the molten resin, hydraulic pressure for actuating the compression cylinders 11 can be adjusted under a multi step control with a combination of timing to modify the volumes of the cavities, thereby avoiding variations in the charge into the two cavities and compensating shrinkage of the resin due to cooling. As a result, sufficient transfer of the surface of the stamper can be obtained, the occurrence of optical deformation can be minimized, and various characteristics required for optical record disc substrates can be eventually satisfied.

Specifically, the respective movable core bodies are actuated under the multi step control with a combination of the optimum hydraulic pressures and timing in order to cope with imbalance in the charge of the molten resin, so that the two optical record disc substrates all can satisfy the required characteristics. For example, in the case of the multi step control where hydraulic pressures and timing of the two compression cylinders 11 and 11 are combined as shown in FIG. 3, a cavity with slow charge is pressurized at a lower level in charging and at a higher level in cooling than the other cavity with rapid charge. Timing is also more delayed with respect to the cavity with slow charge as shown in FIG. 3. In that manner, optical record discs having the same characteristics can be obtained simultaneously. Next, after the molten resin has been charged, the respective cut punch cylinders 12 in control circuits $20_1$ with control valves $19_1$ are actuated at arbitrary timing during the pressure-maintaining step or the cooling step to move the cut punches 5 forward through the movable cut punch blocks 7 until the cut punches get in touch with the fixed gate cuts 6. As a result, central apertures in the optical record disc substrates are formed in the mold. When the mold is opened after the molten resin has been cooled in the mold, the ejection rods 13, and consequently the ejection blocks 10 are actuated to eject from the mold the optical record disc substrates by the ejection sleeves 8 and runners by the ejection pins 9. The substrates and runners ejected from the mold are removed by e.g. a remover.

Although in the embodiment shown, the hydraulic actuation mechanisms are located between the optical record disc mold with the core bodies 2 and the cavity bodies 1 included therein, and the injection molding device, the hydraulic actuation mechanisms can be housed in the movable platen of the injection molding device. The hydraulic cylinders for the ejection pins can be arranged in the mold. The compression cylinders 11 and the cut punch cylinders 12 for the cut punches 5 in the core bodies 2 can be governed under a combination of hydraulic pressures and timing, or under timing control to make the amount of charge in the respective cavities a uniform level.

Figure 5:
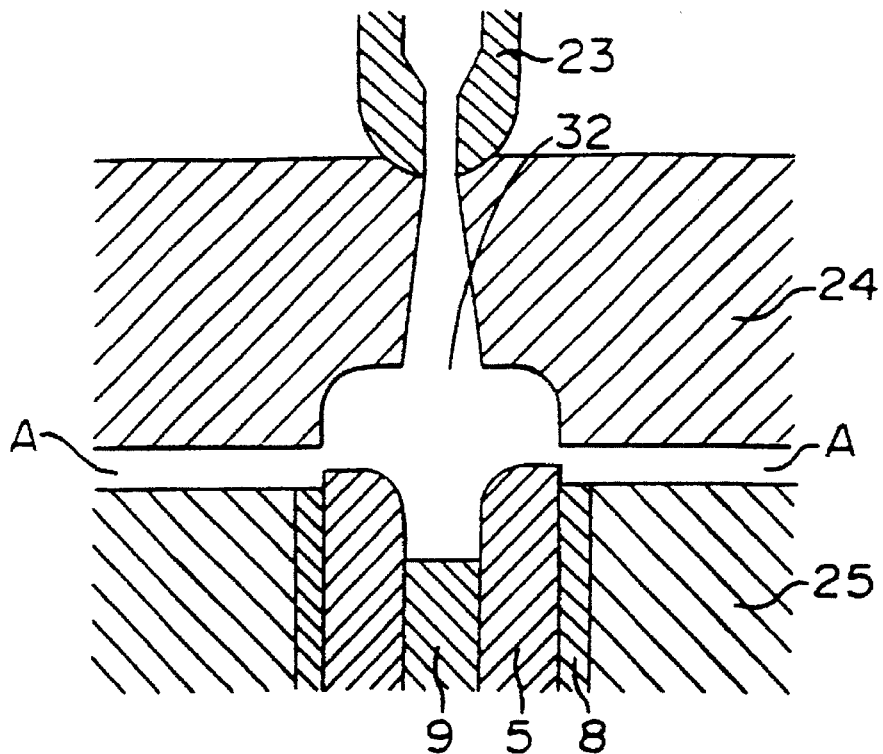
FIG. 5 is a cross sectional view showing a cut punch portion of a mold according to the present invention.
Figure 6:
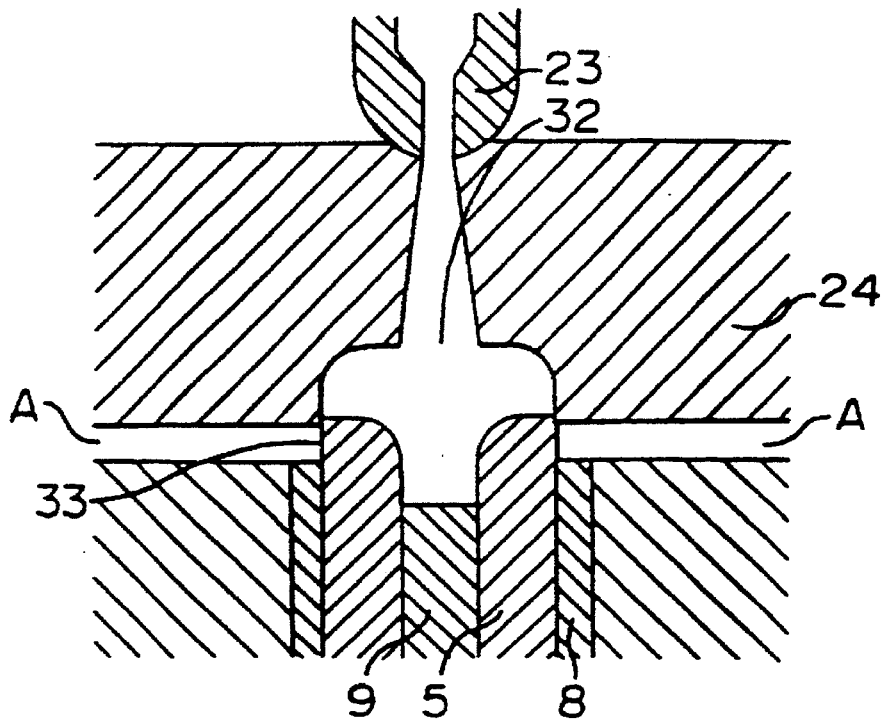
FIG. 6 is a cross sectional view showing the operation of the cut punch portion of FIG. 5.

Now, another preferred embodiment of the present invention will be described in detail. In the embodiment shown in FIGS. 4–9, there is shown one of suitable embodiments wherein the actuation of cut punches can be changed at appropriate timing in the respective cavities to make the amount of resin charge a uniform level. In the state shown in FIG. 5, a resin material is charged from an injection molding device 23 into the cavity A through a runner 32. As soon as the charge has been completed, a cut punch 5 in a sleeve 8 is protrudently actuated to punch out a central aperture 33 as shown in FIG. 6. As a result, the flow of the resin is completely cut, thereby determining the amount of the resin charge.

Figure 7:
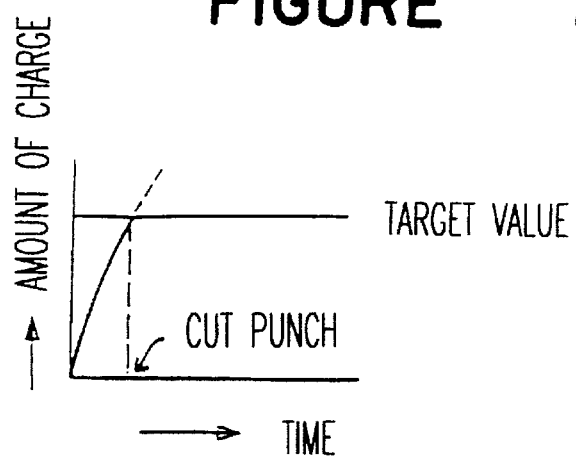
FIG. 7 is a graph showing an operating method of a cut punch.
Figure 8:
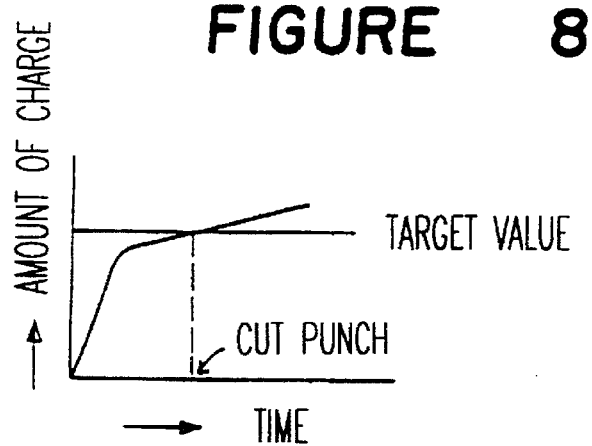
FIG. 8 is a graph showing another operating method of the cut punch.
Figure 9:
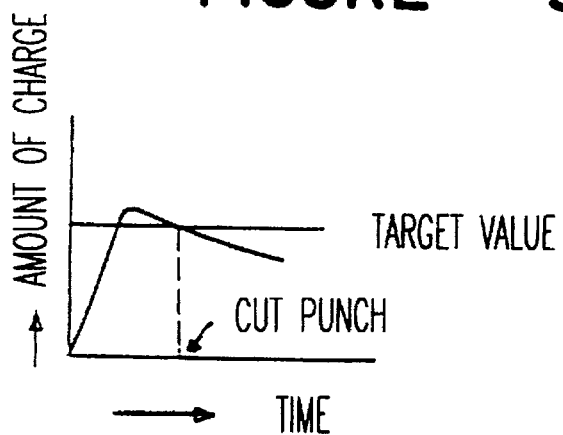
FIG. 9 is a graph showing another operating method of the cut punch.

On the other hand, charging can be carried out in several ways as shown in FIGS. 7–9. If charging is made rapidly as shown in FIG. 7, it is difficult to control actuation timing of the cut punches 5, and variations in the amount of charge become great. For these reasons, it is a usual manner that charging is done slowly at the last stage, and the cut punches 5 is actuated at appropriate timing of charging speed as shown in FIG. 8, or that after excessive charging has been done, the amount of charge is slowly restored, and the cut punches 5 is actuated at appropriate timing as shown in FIG. 9. However, even if such operations are made, simultaneous actuation of the plural cut punches 5 is difficult to obtain an adequate amount of charge in the respective cavities. In order to cope with this problem, the respective cut punches are independently actuated so that adequate actuation timing is determined for each cut punch, and the amount of charge in all cavities can reach an adequate level.

Figure 4:
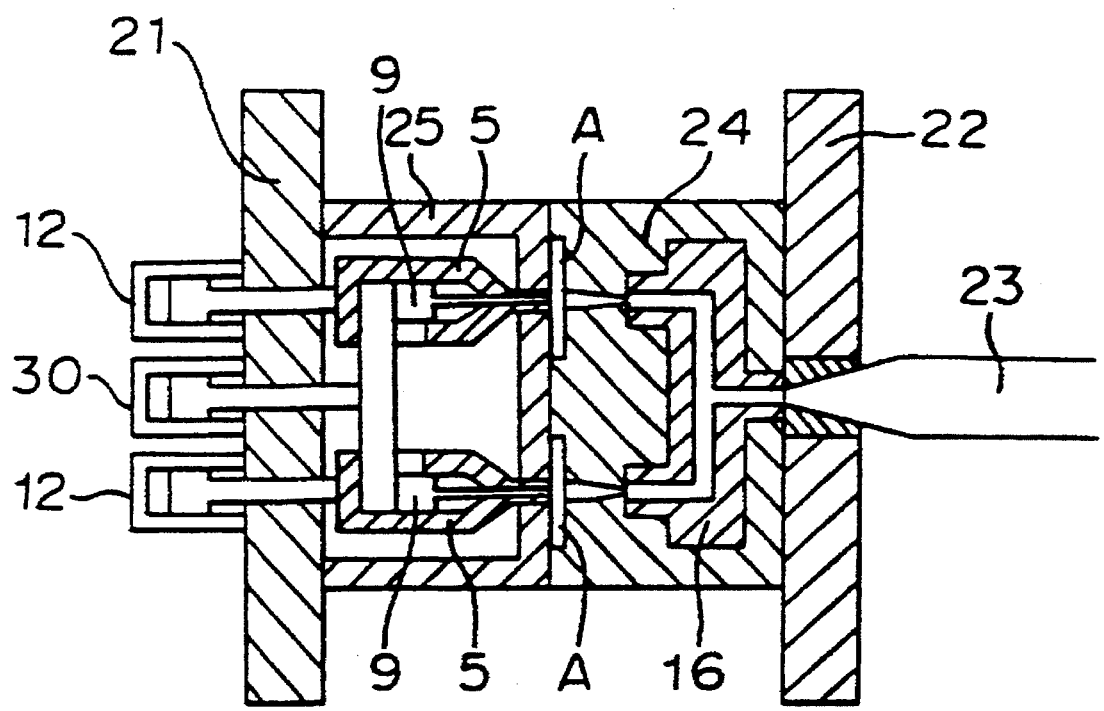
FIG. 4 is a schematic view showing an embodiment of the method of making optical record discs according to the present invention.

The dual molding device shown in FIG. 4 is constituted by a fixed mold half 24 mounted to a fixed platen 22 thereof, and a movable mold half 25 mounted to a movable platen 21 thereof. Both mold halves have mating surfaces formed with cavities A and A, the number of which corresponds to the molding number of discs. The fixed mold half 24 has a runner block 16 incorporated thereinto to distribute in the respective cavities A and A a resin material injected from an injection device 23 of the molding device.

On the other hand, into the movable mold half 25 are incorporated the cut punches 5 and 5 for punching out central runners of discs to form central apertures, and pins 9 and 9 for ejecting the punched runners. Into the movable platen 21 are incorporated a cylinder 30 of a driving mechanisms for driving the runner ejection pins 9 and 9, and cylinders 12 of a driving mechanisms for independently driving the cut punches 5 and 5. The cut punch driving mechanisms are provided with independent controllers (not shown) which enable the respective cut punch driving mechanisms to be actuated at their own arbitrary timing. The cut punches 5 and 5 have leading edges engaged with holes of the movable mold half to be slidable. The leading edges form part of the walls of the cavities A and A when the mold halves are closed. The runner ejection pins 9 and 9 are engaged in axial holes of the cut punches 5 and 5 to be slidable. An injection molding mold constituted by the mold halves is provided with a cooling means as usual.

Now, a molding step will be explained. First, the movable platen 21 is moved to the right direction in the drawings to close both mold halves 24 and 25, and a resin material is injected from the injection device 23. The injected resin material is divided by the runner block 16, and are charged into the respective cavities A and A. At that time, variations in manufacturing process of the runner block and the cavities cause a difference between the two cavities A and A in terms of how much the resin material is charged. In order to minimize the difference, the cut punch driving mechanisms are actuated in such a control that a time difference is introduced between their actuations. Specifically, the cut punches 5 and 5 are moved forwardly in the cavities at their own timing so that the amounts of resin charge in the cavities in molding become the same. After that, cooling progresses in the mold halves, and plasticization measure is carried out in the injection device 23 to prepare for the next injection. Then, the movable platen 21 is moved to open the movable mold half 25, and the ejection driving mechanisms 30 are actuated to eject the molded discs and the punched runners. In that manner, one cycle has been completed.

Although in the embodiment shown in FIG. 4, the cut punch driving mechanisms 12 and 12 are arranged in the movable platen, they may be arranged in the movable mold half. The division of the resin material may be done in the injection device 23 instead of the runner block 16. In addition, the amount of charging the resin material can be intentionally changed in every cavity, which can realize multiple-molding wherein a plurality of discs having different shapes are obtained in a single mold.

Although explanation has been made for the dual molding, in order to mold four discs at the same time, independent actuation of the cut punches, and the actuation of every two cut punches by use of two driving means which is applied only when distribution of the resin is stable can be thought out. This can be also applied to the case wherein eight discs are molded at the same time.

That is to say, in order to group a plurality of cavities, in the case of two cavities, the cavities are divided into two groups so that each cavity is included in the different group; in the case of four cavities, the cavities are divided into four groups so that each cavity is included in the different group, or cavities are paired to make two groups; in the case of six cavities, the cavities are divided into six groups so that each cavity is included in the different group, cavities are paired to make three groups, or cavities are coupled in trios to make two groups; and in the case of eight cavities, the cavities are divided into eight groups so that each cavity is included in the different groups, cavities are paired to make four groups, or cavities are coupled in quartettes to make two groups, for example.

Although at least one of the core compression cylinders 11 as the hydraulic actuation mechanisms, or at least one of the actuation mechanisms for the cut punches 5 is constituted to be independently controlled, in the embodiments stated earlier, the core compression cylinders 11 can be independently controlled in each group, the cut punches 5 can be independently controlled in each group, or the core compression cylinders and the cut punches can be independently controlled.

We claim:

1. An apparatus for making a plurality of optical record disc substrates, the apparatus comprising:

a fixed mold half;

a movable mold half;

a plurality of slidable core bodies which are provided in the movable mold half to form a plurality of cavities between the fixed mold half and the movable mold half; and a plurality of actuation mechanisms, each actuation mechanism cooperating with a respective one of said plurality of core bodies, each actuation mechanism including a hydraulic cylinder for sliding a respective one of said cooperating core bodies, and a hydraulic control circuit having a hydraulic pressure control valve for controlling the corresponding hydraulic cylinder;

wherein each of the hydraulic control circuits independently control an actuation of the respective core bodies by said actuation mechanisms in a multistage manner by combining a control of a hydraulic pressure supplied to said hydraulic cylinder and a timing of the supply of hydraulic pressure to said hydraulic cylinder.

2. An apparatus according to claim 1, wherein each actuation mechanism comprises a core compression hydraulic cylinder connected to each respective core-body through a core block to slide each respective core body, and a cut punch cylinder and an ejection cylinder connected to a gate cut, an ejection pin and an ejection sleeve through a block to slide the gate cut, the ejection pin and the ejection pin.

3. An apparatus according to claim 1, wherein each respective core body is arranged to confront in an opposing manner a fixed cavity associated with said respective core body, and is fit in an outer peripheral ring to be slidable therein, each respective core body further has a central portion provided with a movable gate cutter, an ejection sleeve and an ejection pin to be slidable in an axial direction.

4. An apparatus according to claim 1, wherein a plurality of region flow passages for the cavities are arranged to be located at equal distances about an injection molding mold spool for charging a molten region, and are placed between a movable platen and a fixed platen.

5. An apparatus for making a plurality of optical record disc substrates, the apparatus comprising:

a fixed mold half;

a movable mold half;

a plurality of slidable core bodies provided in the movable mold half;

a driving means for opening and closing the movable mold half with respect to the fixed mold half;

a plurality of cavities which are formed between the movable mold half and the fixed mold half;

an injection means for injecting a resin material into respective cavities of said plurality of cavities; and a plurality of cut punches which come in and out of the respective cavities to punch a hole in a center of discs formed in the core bodies;

wherein the cavities are grouped into a plurality of groups so that each group includes not less than one cavity, and each group is provided with a common hydraulic actuation means for actuating said driving means, said apparatus further comprising control means for controlling an actuation of the hydraulic actuation means independently so as to control an application of hydraulic pressure to said driving means and a timing of the application of hydraulic pressure, so as to permit a uniform injection of resin material in each one of said cavities.

6. An apparatus according to claim 5, wherein each cut punch has a movable ejection pin passed through a central portion of the cut punch, the apparatus further comprising a common pin actuation means for actuating said ejection pin.

7. An apparatus according to claim 5, wherein said control means further controls said hydraulic actuation means during a cooling of said injected resin to compensate for shrinkage of the resin during said cooling.

* * * * *